United States Patent [19]

Carlson et al.

[11] Patent Number: 4,575,898
[45] Date of Patent: Mar. 18, 1986

[54] SEALED BUSHING ASSEMBLY FOR PIVOTAL MEMBERS

[75] Inventors: Frederick D. Carlson, Burlington; Ronald E. Hart, Muscatine, both of Iowa

[73] Assignee: J. I. Case Company, Racine, Wis.

[21] Appl. No.: 651,883

[22] Filed: Sep. 19, 1984

[51] Int. Cl.⁴ ............................................. E05D 11/02
[52] U.S. Cl. ....................................... 16/274; 16/380; 16/DIG. 27
[58] Field of Search ................ 16/273, 274, 380, 381, 16/DIG. 27; 384/130, 276, 286, 295

[56] References Cited
U.S. PATENT DOCUMENTS

| 1,132,348 | 3/1915 | Hunter | 16/DIG. 27 X |
| 2,602,954 | 7/1952 | Steward | 16/274 X |
| 3,449,021 | 6/1969 | Palen | 384/130 X |
| 3,687,226 | 8/1972 | Coyne | 384/276 X |
| 4,251,182 | 2/1981 | Schroeder | 384/276 X |

Primary Examiner—Fred Silverberg
Attorney, Agent, or Firm—Dressler, Goldsmith, Shore, Sutker & Milnamow, Ltd.

[57] ABSTRACT

A bushing assembly is disclosed for effecting a pivotal connection of associated first and second members. Notably, the assembly is of an integrally sealed configuration, and includes concentrically arranged first outer and second inner bushings which are sealed by a pair of annular end caps. An arrangement is provided for conveniently lubricating the interface thus formed between the inner and outer bushings, with the sealed nature of the construction significantly reducing the required maintenance. Notably, final assembly of the pivotal connection provided is effected with a suitable adhesive, thus permitting manual or hand-fitting of the various components for final assembly.

5 Claims, 2 Drawing Figures

SEALED BUSHING ASSEMBLY FOR PIVOTAL MEMBERS

TECHNICAL FIELD

The present invention relates generally to bushing and bearing assemblies for connecting relatively pivotal members, and more particularly to a readily assembled sealed bushing assembly configured for long service life with relatively reduced maintenance.

BACKGROUND OF THE INVENTION

The nature of material handling equipment is such that many different mechanical pivotal connections are required for effecting selective movement of the various articulable components of the equipment. Typically, such pivotal connections are provided between the hydraulic fluid actuators of a material handling device and associated components of the machine, such as a backhoe, a dozer blade, and the like. In view of the high forces which can be generated at such pivotal connections, and in view of the harsh operating conditions to which such equipment is typically subjected, it is very important that such pivotal connections be robust and readily maintained for reliable operation.

In order to assure the continued reliability of such pivotal connections on material handling equipment, in the past it has ordinarily been necessary to supply lubricant, typically via a grease fitting, to the connections on a highly regular or even daily basis. Although such regular maintenance promotes the desired reliable operation of such equipment, such maintenance can be time-consuming and undesirably detract from operating efficiency by adding to "downtime" of the equipment.

Accordingly, it is desirable to provide an arrangement for pivotally connecting first and second associated members for relative pivotal movement which promotes reliable operation with minimal maintenance. Such an arrangement should preferably be relatively straightforward for economy of manufacture, and should promote assembly of the associated pivotal members. With these desired goals in mind, the present bushing assembly has been specifically configured for both reliability and very convenient assembly with associated components.

SUMMARY OF THE INVENTION

A bushing assembly embodying the principles of the present invention is disclosed which promotes convenient and reliable pivotal connection of associated first and second members. Notably, the assembly is provided with a "self-sealed" configuration which not only deters accumulation of harmful dirt and debris in the assembly, but which also acts to retain lubricant within the assembly for highly desirable reduction in maintenance. While the present bushing assembly will be described in association with a material handling implement, it will be understood that a bushing arrangement embodying the inventive concepts disclosed herein has many other different applications where pivotal connection of associated first and second members is required.

In the illustrated embodiment, the present bushing assembly is disclosed as connecting first and second members for relative pivotal movement about an axis, wherein the first member defines an opening or "eye" within which the bushing assembly is positionable, and the second member includes a pin extending through the bushing assembly. As will be recognized, such an arrangement is typical of an interconnection between the "eye" of a hydraulic fluid actuator or the like and an associated clevis-like component.

The bushing assembly includes a first, generally cylindrical bushing positioned within the opening defined by the first member, with the first bushing secured thereto. The assembly further comprises a second, generally cylindrical bushing positioned coaxially within the first bushing to thus define an annular bushing interface therewith. In the illustrated embodiment, the second bushing defines another opening through which the second member, in the form of a pivot pin, extends. The second bushing is secured to the pin of the second member, whereby the first and second bushings are relatively rotatable about the pivot axis attendant to relative pivotal movement of the first and second members.

The present bushing assembly further includes means for retaining the second bushing in position within the first bushing, which in the illustrated embodiment comprises a pair of annular sealing end caps fitted to respective opposite ends of the first and second bushings. The end caps are secured to one of the first and second bushings, and in the preferred form, are secured to the second bushing by a suitable adhesive.

In order to promote convenient and efficient assembly of the bushing assembly with the associated first and second members, it is presently preferred that one of the first and second bushings is secured to the respective one of the first and second members by a suitable adhesive, while the other of the first and second bushings is secured to its respective one of the first and second members by an interference fit. By this preferred construction, the first and second bushings and the end caps can be pre-assembled, and thereafter fitted within the opening defined by the first member by an interference "press" fit. The pivot pin of the second member can thereafter be manually inserted through the opening defined by the second bushing, with the pivot pin and the second bushing thereafter secured together with adhesive.

In the illustrated embodiment, the second member is shown as further comprising a pair of second link elements fitted to respective opposite ends of the pivot pin. In the preferred form, the second link elements and the pivot pin are secured to each other with adhesive after the pivot pin has been manually fitted into the bushing assembly.

To promote reliable operation with minimal service, the present bushing assembly includes means for lubricating the annular bushing interface between the first and second bushings. To this end, at least one generally radially extending lubricant passage is defined by the first bushing, with an annular lubricant channel provided at the bushing interface which communicates with the lubricant passage. In the preferred form, the first outer bushing preferably defines a plurality, such as four, of the radially extending, lubricant passages. Lubricant, such as grease, is forced into the assembly via a grease fitting provided on the first member, with the lubricant thus forced under pressure through the radial lubricant passages in the first bushing and into tne lubricant channel at the busning interface. During lubrication in this manner, the old lubricant is forced out around the ends of the first bushing and out of the assembly.

Numerous other features and advantages of the present invention will become readily apparent from the following detailed description, the accompanying drawings, and the appended claims.

DETAILED DESCRIPTION

Figure 1:
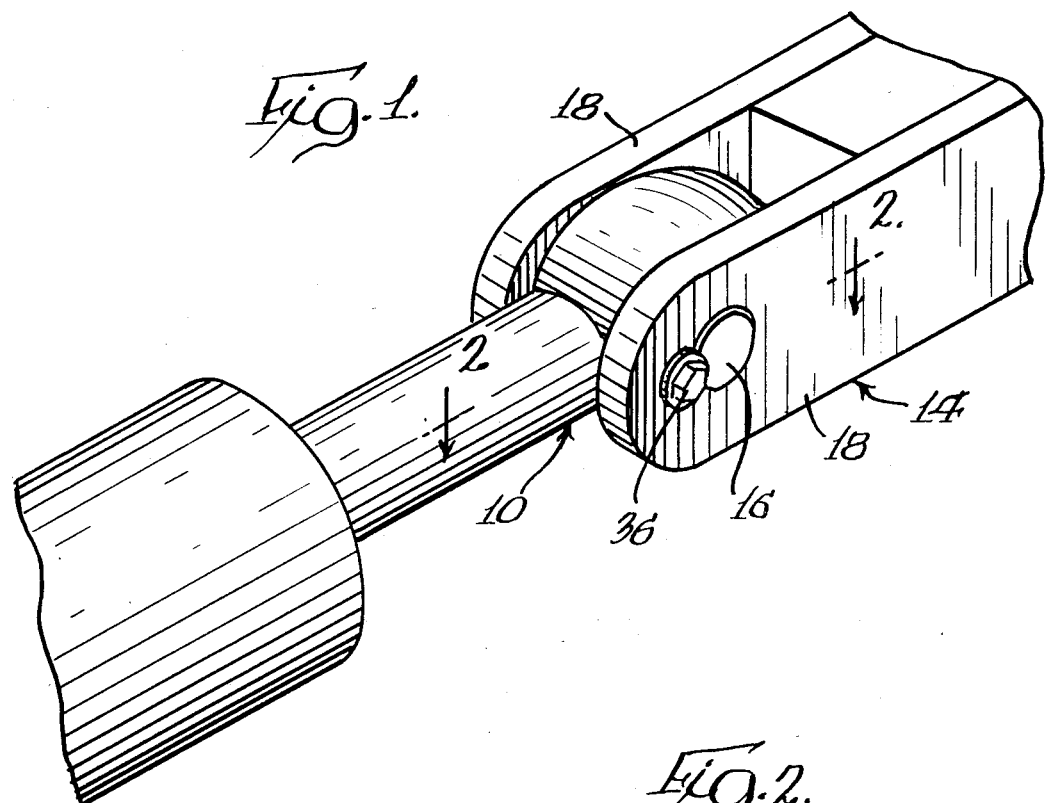
FIG. 1 is a perspective view illustrating first and second members which are connected for relative pivotal movement by a bushing assembly embodying the principles of the present invention.
Figure 2:
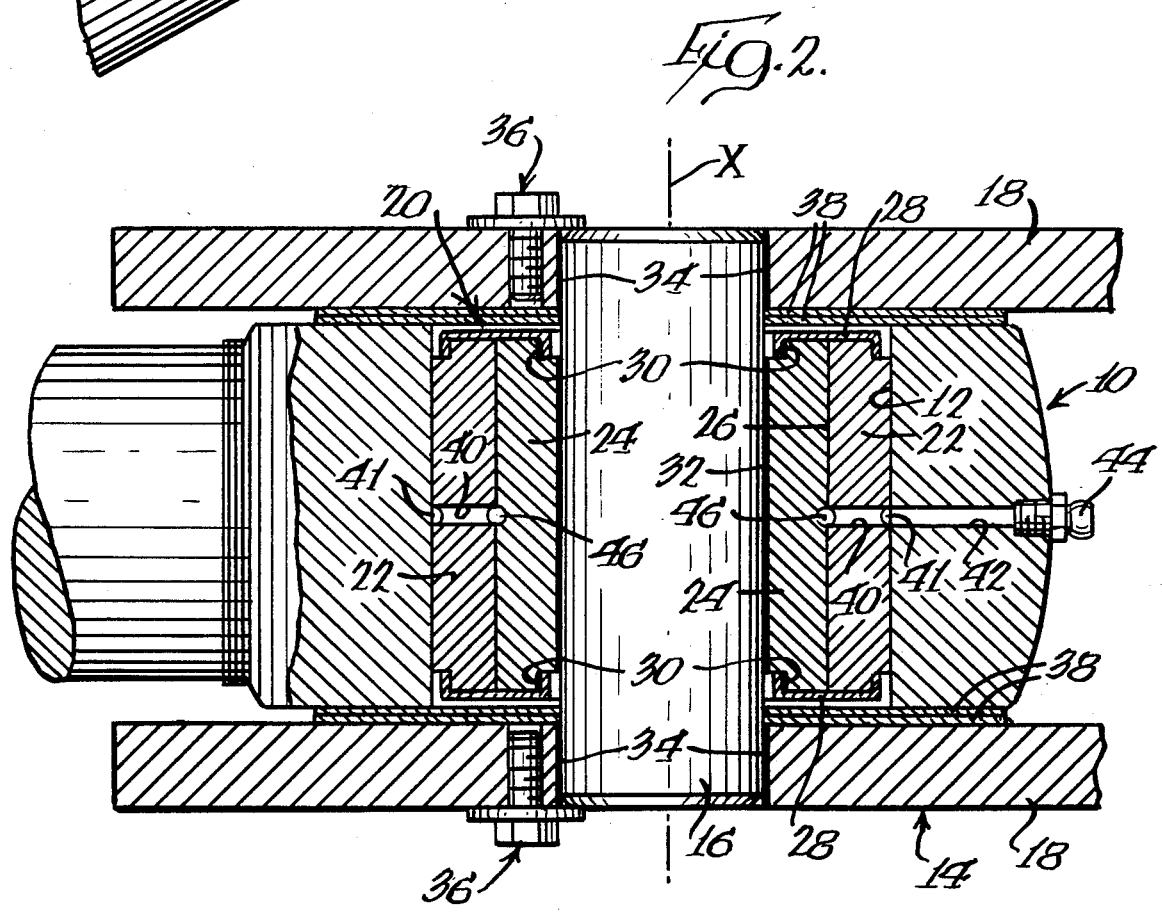
FIG. 2 is a cross-sectional view taken along lines 2—2 of FIG. 1 illustrating in detail the present bushing assembly.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference now to tne drawings, therein is illustrated a bushing assembly embodying the principles of the present invention, shown connecting first and second members for relative pivotal movement about an axis, designated "X". For purposes of illustration, first member 10 is shown as the end portion of a piston rod of a hydraulic fluid actuator. Accordingly, the first member 10 is illustrated as defining an "eye" or opening 12 within which the bushing assembly is positionable.

Second member 14 is illustrated with a clevis-like configuration as is typical for components pivotally joined to a fluid actuator. Thus, the second member 14 includes a pivot pin 16 which extends through the bushing assembly, and a pair of second link elements 18 which are secured to respective opposite ends of the pin 16.

A bushing assembly 20 of the present invention is operatively connected with the first and second members 10 and 14 for connecting the members for relative pivotal movement about the axis "X". As will be further described, the bushing assembly 20 is specifically configured for prefabrication or pre-assembly, and is thereafter positionable within the opening 12 defined by first member 10. In accordance with the present invention, the connection of the first and second members for relative pivotal movement can be completed by manual or hand-fitting of the pivot pin 16 through the link elements 18 and the bushing assembly 20.

The bushing assembly includes a first outer bushing 22 which is secured to first member 10, and a second inner bushing 24 positioned coaxially within the first outer bushing 22. Each of the bushings is preferably of a generally cylindrical configuration, with an annular bushing interface 26 thus defined at the interface between the first and second bushings. As will be recognized by those familiar with the art, various metallic materials, such as alloy steels, can be suitably employed for fabrication of the first and second bushings 22 and 24. As will be further recognized, suitable clearance is provided between first outer bushing 22 and second inner bushing 24 at interface 26 so that film lubrication therebetween is established and maintained, witn metal-to-metal contact avoided.

The bushing assembly 20 further includes a pair of annular sealing end caps 28 for retaining the second inner bushing 24 in position within the outer bushing 22, and for sealing the bushing interface 26 against moisture and debris. The end caps 28 are fitted to respective opposite ends of the first and second bushings 22 and 24, and are preferably each secured to one of the bushings. In the preferred form, the end caps 28 are secured at 30 with an adhesive to the second bushing 24. An anaerobic adhesive, various suitable forms of which are commercially available, is preferably employed. Adhesives of this nature are capable of maintaining their integrity when subjected to vibration and the like, but can be released or "broken" with the use of suitable tools for disassembly if desired.

As noted, the bushing assembly 20, comprising first outer and second inner bushings 22 and 24, and end caps 28, is preferably pre-assembled and is thereafter positioned within opening 12 defined by first member 10. In order to secure the first outer bushing 22 to the first member 10, outer bushing 22 of the bushing assembly is preferably positioned within opening 12 with an interference fit. This permits the bushing assembly to be secured to the first member 10 before final assembly of the pivotal connection, thus facilitating convenience in assembling tne first and second members for relative pivotal movement.

In accordance with the present invention, the second inner bushing 24 is secured to the second member 14 for movement therewith. To this end, the bushing 24 is preferably secured to the pivot pin 16 of the second member 14 with adhesive at 32. Further, the pivot pin 16 is preferably secured to the second link elements 18 of the second member 14 with adhesive at 34. Again an anaerobic adhesive is preferably employed at 32 and 34.

As will be recognized, use of adhesive in this manner further facilitates the pivotal connection of the first and second members 10 and 14 by permitting manual or hand-fitting of the pivot pin 16 through the link members 18 and the opening defined by second bushing 24. Mechanical securement means are preferably provided on the second link elements 18 for retaining the pivot pin 16 in position, and to this end, bolt and washer assemblies 36 are respectively provided on the link elements 18 for engagement with the opposite ends of the pivot pin 16. Annular shims 38 are preferably fitted about the pivot pin 16 between each end cap 28 and its respective link element 18 to prevent undesired relative movement of the components along the pivot axis "X".

As noted, the construction of the bushing assembly 20 is such that the interface 26 between the inner and outer bushings 22 and 24 is sealed by end caps 28, thus desirably retaining lubricant within the assembly while acting to prevent the entry of dirt or debris which could otherwise undesirably accelerate the wear of the bushings. In order to effect lubrication of the bushing interface, the present invention preferably includes one or more lubricant passages 40 (two of a plurality such as four being shown) which extend generally radially through the first outer bushing 22. Lubricant passages 40 are aligned and communicate with an outer annular lubricant channel 41 defined by the outer surface of first bushing 22. Outer channel 41 in turn is aligned and communicates with a lubricant passage 42 defined by first member 10, with a suitable grease fitting 44 (i.e., a check valve) provided on the first member 10 for introducing lubricant under pressure into the passage 42, outer channel 41, and passages 40.

Distribution of lubricant about the annular bushing interface 26 is facilitated by the formation of an annular lubricant channel 46 defined by the first and second bushings 22 and 24. Lubricant channel 46 extends about the annular bushing interface 26, and communicates with the radially extending lubricant passages 40 defined by the first outer bushing 22. Thus, lubricant can readily be introduced into the interface between the relatively rotatable first and second bushings 22 and 24, with the sealed nature of the construction facilitating retention of the lubricant in the bushing assembly to greatly reduce the maintenance required for reliable operation of the pivot connection. It is believed that the pivotal connection of the present invention can be operated for significantly greater periods than a conventional construction before new lubricant need be introduced into the bushing assembly. When new lubricant is forced into the assembly via fitting 44, the old lubricant is forced out between the first outer bushing 22 and the end caps 28 and out past the shims 38.

Thus, a bushing assembly for effecting pivotal connection of associated first and second members is disclosed which greatly facilitates convenient assembly and reliable operation with minimal maintenance. From the foregoing, it will be observed that numerous modifications and variations can be effected without departing from the true spirit and scope of the novel concept of the present invention. It is to be understood that no limitation with respect to the specific embodiment disclosed is intended or should be inferred. It is, of course, intended to cover by the appended claims all such modifications as fall witnin the scope of the claims.

What is claimed is:

1. A bushing assembly for connecting first and second members for relative pivotal movement about an axis, wherein said first member defines an opening within which said assembly is positionable, and said second member comprises a pin extending through said bushing assembly, said assembly comprising:

first bushing means positioned within said opening and secured to said first member;

second bushing means positioned coaxially within said first bushing means to define an annular bushing interface therewith, said second bushing means defining another opening through which said pin of said second member extends, said second bushing means being secured to said pin, whereby said first and second bushing means are relatively rotatable about said axis attendant to relative pivotal movement of said first and second members;

means for retaining said second bushing means in position within said first bushing means comprising a pair of annular end caps fitted to respective opposite ends of said first and second bushing means, said end caps being secured to one of said first and second bushing means for rotational movement relative to the other of said first and second bushing means; and means for lubricating said bushing interface comprising at least one lubricant passage defined by said first bushing means, and an annular lubricant channel communicating with said lubricant passage, said lubricant channel being defined by said first and second bushing means and extending about said bushing interface.

2. A bushing assembly in accordance with claim 1, wherein said end caps are secured by adhesive means to said one of said first and second bushing means.

3. A bushing assembly in accordance with claim 2, wherein said second member further comprises a pair of second elements secured to respective opposite ends of said pin by adhesive means.

4. A bushing assembly in accordance with claim 3, including mechanical securement means on said second elements engageable with opposite ends of said pin for preventing relative axial movement of said pin, and annular shim means positioned about said pin between each of said second elements and each said annular end cap.

5. A bushing assembly in accordance with claim 1, wherein said first bushing means is secured to said first member by interference fit means, and said second bushing means is secured to said pin of said second member by adhesive means.

* * * * *

UNITED STATES PATENT AND TRADEMARK OFFICE
CERTIFICATE OF CORRECTION

PATENT NO. : 4,575,898

DATED : March 18, 1986

INVENTOR(S) : Frederick D. Carlson et al.

It is certified that error appears in the above-identified patent and that said Letters Patent is hereby corrected as shown below:

Column 2, line 62, "tne" should be -- the --.

Column 3, line 21, "tne" should be -- the --.

Column 3, line 63, "witn" should be -- with --.

Column 4, line 21, "tne" should be -- the --.

Signed and Sealed this

Twenty-fourth Day of June 1986

[SEAL]

Attest:

DONALD J. QUIGG

Attesting Officer

Commissioner of Patents and Trademarks